US010036687B2

(12) United States Patent
Kim et al.

(10) Patent No.: US 10,036,687 B2
(45) Date of Patent: Jul. 31, 2018

(54) UNIVERSAL BUCK FOR SLED TEST (71) Applicant: HYUNDAI MOTOR COMPANY, Seoul (KR)

(72) Inventors: Hee Seok Kim, Yongin-si (KR); Jong Pil Yoon, Incheon (KR)

(73) Assignee: Hyundai Motor Company, Seoul (KR)

(*) Notice: Subject to any disclaimer, the term of this patent is extended or adjusted under 35 U.S.C. 154(b) by 126 days.

(21) Appl. No.: 15/200,715

(22) Filed: Jul. 1, 2016

(65) Prior Publication Data

US 2017/0131182 A1 May 11, 2017

(30) Foreign Application Priority Data

Nov. 9, 2015 (KR) .................. 10-2015-0157011

(51) Int. Cl.
*G01M 17/007* (2006.01)

(52) U.S. Cl.
CPC .............. *G01M 17/0078* (2013.01)

(58) Field of Classification Search
CPC .. G01M 17/0078; G01M 7/08; G01M 99/004; G01M 17/04; G01M 99/00; G01N 3/30; G01N 17/004; G01N 17/00; G01N 17/002; G01N 3/00; G01N 3/307; G01N 3/303; G01N 2203/0039; B64G 7/00; G01C 25/00; G01C 25/005; B25J 9/1692; B62D 15/02; G01B 21/042; B82Y 35/00; G01P 21/02; G01P 21/00; G01P 15/125; G01P 15/18; B60R 21/0132; G01D 18/00
USPC ....... 73/12.04, 865.3, 1.75, 1.79, 1.37, 1.38, 73/1.39, 11.04, 12.01, 12.05, 12.07, 73/12.09, 865.6
See application file for complete search history.

(56) References Cited

U.S. PATENT DOCUMENTS

| | | | | |
|---|---|---|---|---|
| 5,167,396 A | * | 12/1992 | Burba | F16F 1/428 248/610 |
| 5,355,716 A | * | 10/1994 | Castelli | G01P 21/00 73/1.39 |
| 5,611,192 A | * | 3/1997 | Weder | B65B 25/026 53/219 |
| 5,929,348 A | * | 7/1999 | Stein | G01M 7/08 73/12.07 |

(Continued)

FOREIGN PATENT DOCUMENTS

| | | |
|---|---|---|
| CN | 202119612 U | 1/2012 |
| EP | 2354777 A1 | 8/2011 |

(Continued)

OTHER PUBLICATIONS

Korean Office Action dated Jan. 31, 2017, issued in Korean patent application No. 10-2015-0157011.

*Primary Examiner* — John Fitzgerald
*Assistant Examiner* — Truong D Phan
(74) *Attorney, Agent, or Firm* — McDermott Will & Emery LLP (57) ABSTRACT

A universal buck for a sled test includes a support plate rotatably installed to adjust a yawing angle of the support plate, a plurality of pillars mounted on the support plate, a roof mounted on at least some of the plurality of pillars, and a windshield mounted between pillars disposed on a front side among the plurality of pillars and a front end of the roof, wherein the plurality of pillars, the roof, and the windshield are mounted to be adjustable in position on the support plate.

17 Claims, 8 Drawing Sheets

(56) References Cited

U.S. PATENT DOCUMENTS

| | | | | |
|---|---|---|---|---|
| 6,061,922 A * | 5/2000 | Tzeng | ................... | G01B 3/303 269/165 |
| 6,178,805 B1 * | 1/2001 | Kosaraju | ........... | G01M 17/0078 73/12.04 |
| 6,361,035 B1 * | 3/2002 | Collins | .................. | B23Q 3/103 269/152 |
| 7,164,117 B2 * | 1/2007 | Breed | ................ | B60R 21/01516 250/208.1 |
| 7,610,792 B2 | 11/2009 | Chen et al. | | |
| 2002/0057007 A1 * | 5/2002 | Furukawa | .............. | B60N 2/015 297/344.11 |
| 2005/0285493 A1 * | 12/2005 | Hu | ....................... | H05K 7/1489 312/334.4 |
| 2006/0208169 A1 * | 9/2006 | Breed | .................... | B60N 2/002 250/221 |
| 2008/0011047 A1 * | 1/2008 | Dragan | ............. | G01M 17/0078 73/12.07 |
| 2008/0036580 A1 * | 2/2008 | Breed | ............... | B60R 21/01536 340/438 |
| 2008/0121014 A1 * | 5/2008 | Chen | ................. | G01M 17/0078 73/12.01 |
| 2008/0144944 A1 * | 6/2008 | Breed | ................ | G06K 9/00369 382/224 |
| 2011/0032172 A1 * | 2/2011 | Kirby | .................... | H01Q 1/084 343/878 |
| 2011/0192240 A1 * | 8/2011 | Kruse | ............... | G01M 17/0078 73/865.3 |
| 2011/0192241 A1 * | 8/2011 | Aiki | ................ | G01M 17/0078 73/865.3 |
| 2015/0089995 A1 * | 4/2015 | Lilley | ............... | G01M 17/0078 73/12.07 |
| 2015/0298239 A1 * | 10/2015 | Song | .................. | B23K 11/3072 29/762 |

FOREIGN PATENT DOCUMENTS

| | | |
|---|---|---|
| KR | 10-2002-0054769 A | 7/2002 |
| KR | 10-0613717 B1 | 8/2006 |
| KR | 10-2008-0026817 A | 3/2008 |

* cited by examiner

United States Patent US 10,036,687 B2

UNIVERSAL BUCK FOR SLED TEST

CROSS-REFERENCE TO RELATED APPLICATION

This application is based on and claims the benefit of priority to Korean Patent Application No. 10-2015-0157011, filed on Nov. 9, 2015 with the Korean Intellectual Property Office, the disclosure of which is incorporated herein in its entirety by reference.

TECHNICAL FIELD

The present disclosure relates to a universal buck for a sled test, and more particularly, to a universal buck for a sled test that can be extensively utilized even at a stage of advanced engineering and development of vehicles.

BACKGROUND

A sled test may be performed prior to a real car crash test for improving crash performance and data collection of vehicles, as well as optimization of dummy behavior characteristics of restraint devices (e.g., a seat belt, a seat, an airbag, etc.).

The sled test may be performed after a buck is installed in sled equipment. The buck may be a structure having only an occupant compartment remaining as other parts are removed from a body in white (BIW). Here, various components fitting a corresponding vehicle are installed in the buck in order to replicate a real car environment.

In order to perform a sled test, a BIW for producing a buck is generally required, but an advanced engineered car does not yet have a BIW, so there is no buck. Thus, in many cases, a sled test cannot be performed and an advanced engineered car may rely on an interpretation, or estimation, or a sled test is omitted in an advanced engineering stage.

Also, even in a case of a car with a frame, a degree of replication of various parts installed in the buck may not be so high that optimization of restraint devices and passenger behavior characteristics based on a sled test are effectively analyzed.

In addition, when a small overlap test is performed, a behavior of yawing and projection of a column may cause a behavior replication of a dummy to be lowered.

SUMMARY

The present disclosure has been made to solve the above-mentioned problems occurring in the prior art while advantages achieved by the prior art are maintained intact.

An aspect of the present disclosure provides a universal buck for a sled test, allowing a plurality of components installed thereon to be easily adjusted in position to fit various car frame conditions, and thus being easily extensively utilized even in an advanced engineering stage of a vehicle.

An aspect of the present disclosure provides a universal buck for a sled test, having a structure in which a yawing, or yaw, angle is freely adjustable, thus easily realizing replication or approximation of a small overlap test.

According to an exemplary embodiment of the present disclosure, a universal buck for a sled test may include: a support plate rotatably installed to adjust a yawing angle of the support plate; a plurality of pillars mounted on the support plate; a roof mounted on at least some of the plurality of pillars; and a windshield mounted between pillars disposed on a front side among the plurality of pillars and a front end of the roof, wherein the plurality of pillars, the roof, and the windshield are mounted to be adjustable in position on the support plate.

A plurality of mounting holes spaced apart from one another at a predetermined interval may be provided in both left and right portions of the support plate, and the plurality of pillars may be mounted to be adjustable in position with respect to the support plate through the plurality of mounting holes.

The plurality of pillars may include a pair of first pillars installed on a front side of the support plate and disposed to be symmetrical laterally; a pair of second pillars spaced apart from the pair of first pillars backwardly and disposed to be symmetrical laterally; and a pair of third pillars spaced apart from the pair of second pillars backwardly and disposed to be symmetrical laterally.

The universal buck may further include: a pair of extending members extending in a length direction of the support plate across upper ends of the pair of second pillars and upper ends of the pair of third pillars, wherein the pair of extending members may be disposed to be symmetrical laterally.

The roof may be mounted on the pair of extending members, a plurality of mounting holes spaced apart from one another at a predetermined interval may be provided in the pair of extending members, and the roof may be mounted to be adjustable in position through the plurality of mounting holes of the pair of extending members.

The universal buck may further include: a door mounted to be adjustable in position between pillars of the plurality of pillars.

The door may include an adjustment member installed to be adjustable in position between pillars of the plurality of pillars, an inner frame attached to the adjustment member, and a panel coupled to the inner frame.

The adjustment member may have a plurality of mounting holes spaced apart from one another at a predetermined interval, and may be mounted to be adjustable in position between pillars of the plurality of pillars through the plurality of mounting holes.

The universal buck may further include: a cable mounting part mounted to be adjustable in position on the pair of extending members, wherein a cable may be mounted on the cable mounting part.

The windshield may be mounted to be adjusted at a tilt angle between upper ends of the pair of first pillars and front end portions of the pair of extending members.

The cable mounting part may include a mounting plate on which a plurality of mounting holes is provided and a plurality of mounting tubes coupled to be adjustable in position on one surface of the mounting plate through the plurality of mounting holes is provided, and the cable may be mounted on the plurality of mounting tubes.

Mounting tubes of the plurality of mounting tubes may have different lengths.

A plurality of coupling blocks may be provided on the other surface of the mounting plate and protrude toward the pair of extending members, and the plurality of coupling blocks may be coupled to the pair of extending members such that the plurality of coupling blocks are adjustable in position.

A spacer block having a plurality of mounting holes may be provided at the pair of extending members, the plurality of mounting holes may be disposed to be lower than the pair of extending members, and the plurality of coupling blocks may be coupled to the spacer block such that the plurality of coupling blocks are adjustable in position via the plurality of mounting holes.

The universal buck may further include: a seat mounting part installed on the support plate, wherein a seat jig for mounting a seat may be installed on the seat mounting part.

The seat jig may be a seat jig for a whiplash test.

The universal buck may further include: a camera mounting part for imaging a dummy behavior when a sled test is performed, wherein the camera mounting part may be rotatably installed to adjust an image capture angle of a camera.

According to another exemplary embodiment of the present disclosure, a universal buck for a sled test may include: a support plate installed to be rotatable centered around a vertical axial line; a base plate for supporting rotation of the support plate; a plurality of pillars installed on the base plate; a roof mounted on at least some of the plurality of pillars; and a windshield installed between pillars disposed on a front side among the plurality of pillars and a front end of the roof, wherein the plurality of pillars, the roof, and the windshield are mounted to be adjustable in position on the support plate.

The support plate may be connected to the base plate via a pivot and may be rotatable around the pivot with respect to the base plate.

The pivot may include a circular bearing, and the circular bearing may have a rotational center.

A slot having a circular arc shape may be provided in at least one of a front end portion and a rear end portion of the support plate, and the base plate may have a plurality of fastening holes spaced apart from one another in a circular arc direction of the slot.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiment of the present disclosure will be described in detail with reference to the accompanying drawings. For reference, dimensions of elements or thicknesses of lines illustrated in the drawings referred to describe the present disclosure may be exaggerated for to aid understanding. Also, the terms used henceforth have been defined in consideration of the functions of the present disclosure, and may be altered according to the intent of a user or operator, or conventional practice. Therefore, the terms should be defined on the basis of the entire content of this specification.

FIGS. 1 through 7 are views illustrating a universal buck for a sled test according to an exemplary embodiment of the present disclosure.

Figure 1:
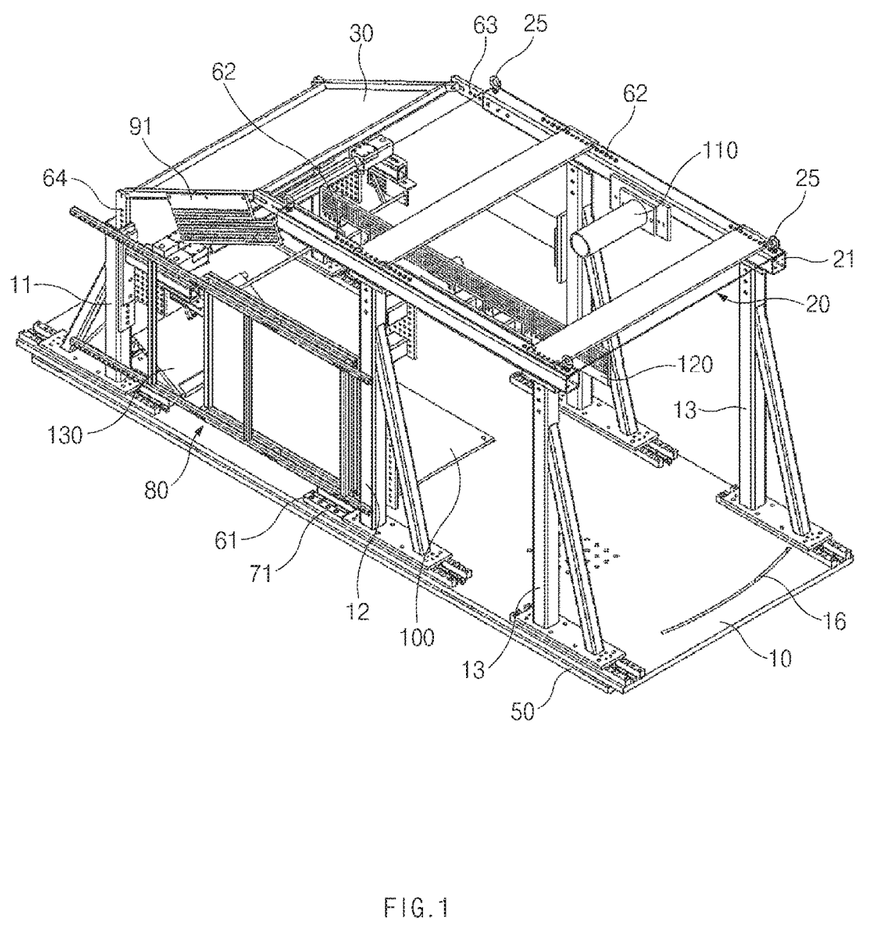
FIG. 1 is a perspective view illustrating a universal buck for a sled test according to an exemplary embodiment of the present disclosure.
Figure 2:
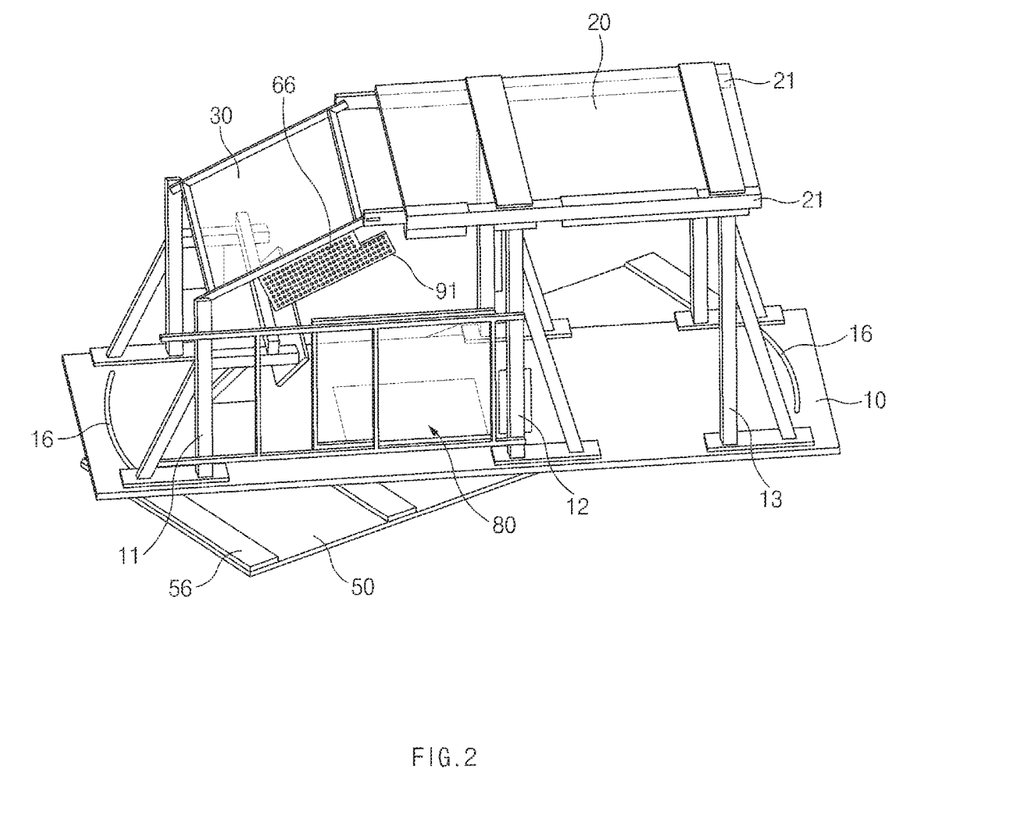
FIG. 2 is a view illustrating a state in which a support plate of a universal buck for a sled test is rotated in relation to a base plate according to an exemplary embodiment of the present disclosure.

Referring to FIGS. 1 and 2, a universal buck for a sled test according to an exemplary embodiment of the present disclosure may include a support plate 10, a plurality of pillars 11, 12, and 13 mounted on the support plate 10, a roof 20 mounted on at least some of the plurality of pillars 11, 12, and 13, and a windshield 30 installed to be sloped between pillars disposed on a front side, among the plurality of pillars 11, 12, and 13, and a front end of the roof 20.

As illustrated in FIG. 2, the support plate 10 may be rotatably installed to adjust a yaw, or yawing, angle. For example, an adjustment range of the yaw angle may range from 0 to 30°. Since the yaw angle of the support plate 10 is adjustable, replication of a small overlap test may be enhanced.

Figure 3:
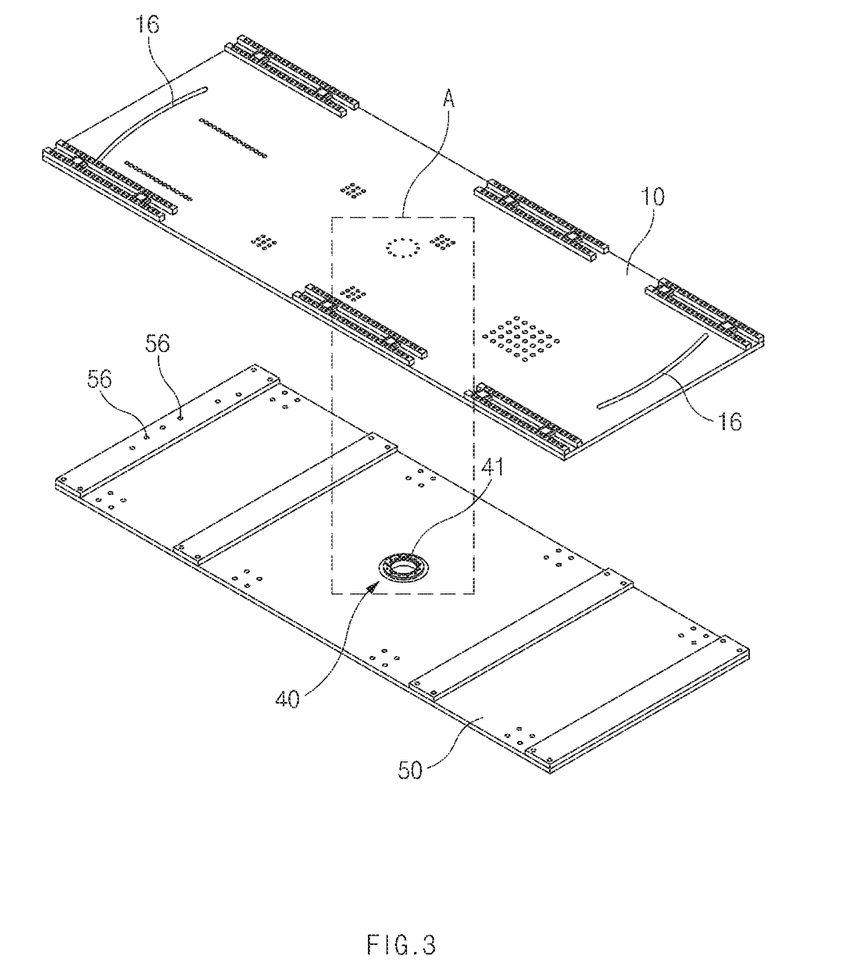
FIG. 3 is an exploded perspective view illustrating a state in which a support plate and a base plate of a universal buck for a sled test are separated according to an exemplary embodiment of the present disclosure.

As illustrated in FIG. 3, a base plate 50 may be disposed below the support plate 10. The support plate 10 may be rotatably installed with respect to the base plate 50 via a pivot 40, and thus, the support plate 10 may rotate centered around a vertical axial line V of the pivot 40.

The pivot 40 may be installed between a middle portion of the support plate 10 and a middle portion of the base plate 50.

Figure 4:
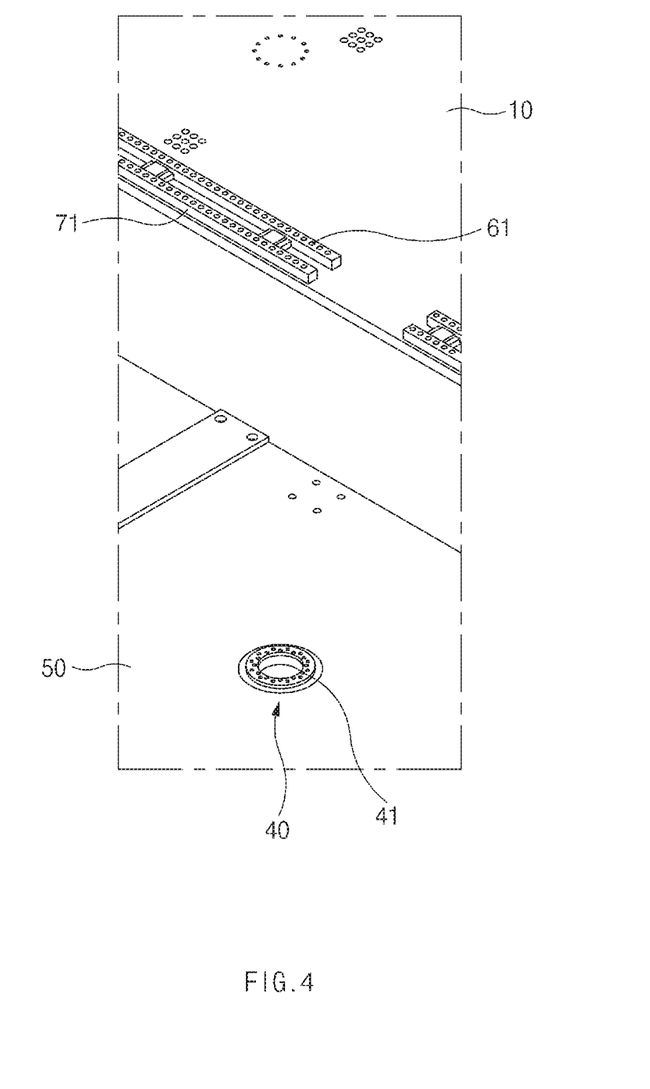
FIG. 4 is an enlarged view of a portion "A" of FIG. 3.

Referring to FIGS. 3 and 4, the pivot 40 may include a circular bearing 41. The circular bearing 41 may be installed in a middle portion of the base plate 50, and a middle portion of the support plate 10 may be rotatably supported with respect to an upper surface of the circular bearing 41.

A slot 16 having a circular arc shape may be provided in at least any one of a front end portion and a rear end portion of the support plate 10. A plurality of fastening holes 56 spaced apart from one another in a circular arc direction of the slot 16 may be provided in at least one of the front end portion and the rear end portion of the base plate 50. Thus, a yawing angle of the support plate 10 may be appropriately adjusted by rotating the support plate 10 around the pivot 40 and the support plate 10 may be subsequently fixed at the adjusted yawing angle thereof by fastening one or more fasteners into the slot 16 and the fastening hole 56, thus preventing damage in the course of a test.

In this manner, since the support plate 10 and the base plate 50 may be firmly fixed after the yawing angle is adjusted, replication of a small overlap test may be enhanced.

The plurality of pillars 11, 12, and 13 may include a pair of first pillars 11 installed on a front portion of the support plate 10, a pair of second pillars 12 spaced apart from the first pillars 11 backwardly, or towards the rear, and a pair of third pillars 13 spaced apart from the second pillars 12 backwardly, or towards the rear.

The first pillars 11, copying or approximating or replicating A-pillars of an actual vehicle, may be disposed to be symmetrical left and right on the support plate 10.

The second pillars 12, copying or approximating or replicating B-pillars of an actual vehicle, may be disposed to be symmetrical left and right on the support plate 10.

The third pillars 13, copying or approximating or replicating C-pillars of an actual vehicle, may be disposed to be symmetrical left and right on the support plate 10.

Meanwhile, a plurality of first mounting holes 61 may be provided in both left and right edges of the support plate 10, and the first pillars 11, the second pillars 12, and the third pillars 13 may be adjusted in position in a length direction at both left and right sides of the support plate 10.

A plurality of support bars 71 may be provided on both left and right edges of the support plate 10, and the plurality of first mounting holes 61 may be provided in the support bars 71. In a state in which lower ends of the plurality of pillars 11, 12, and 13 are mounted on an upper surface of the support bars 17, fasteners may be fastened to the first mounting holes 61, whereby the pillars 11, 12, and 13 may be easily adjusted in position on both left and right sides of the support plate 10.

The roof 20, a component copying or approximating or replicating a roof panel of a real car, may be installed on the top of the pair of the second pillars 12 and the pair of third pillars 13. A plurality of loops 25 may be provided on the top of the roof 20, and a hoist may be connected to the loops 25 to facilitate movement or installation of the roof 20.

The roof 20 may be mounted on top of a pair of extending members 21 such that the roof 20 may be adjusted in position. The pair of extending members 21 may be disposed to be symmetrical bilaterally. A left extending member 21 may extend across an upper end of the second pillar 12 and an upper end of the third pillar 13 positioned on the left, and a right extending member 21 may extend across an upper end of the second pillar 12 and an upper end of the third pillar positioned on the right.

The extending members 21 each may have a plurality of second mounting holes 62 spaced apart from one another at a predetermined interval, and the roof 20 may be mounted to be adjusted, or adjustable, in position in a forward/backward direction by selectively fastening a fastener to the plurality of second mounting holes 62.

The windshield 30, a component copying or approximating or replicating a front window glass of vehicle, may be mounted between front end portions of the extending members 21 and the first pillars 11 such that a tilt angle thereof is adjustable.

Third mounting holes 63 may be provided to be spaced apart from one another by a predetermined interval in the front end portions of the extending members 21, and fourth mounting holes 64 may be provided to be spaced apart from one another in upper ends of the first pillars 11.

Thus, as an upper end of the windshield 30 may be mounted to be adjustable in position in a forward/backward direction through the third mounting holes 63 of the extending members 21 and a lower end of the windshield 30 may be mounted to be adjustable in position in a vertical direction through the fourth mounting holes 64 of the first pillars 11, a tilt angle of the windshield 30 may be adjusted.

Figure 5:
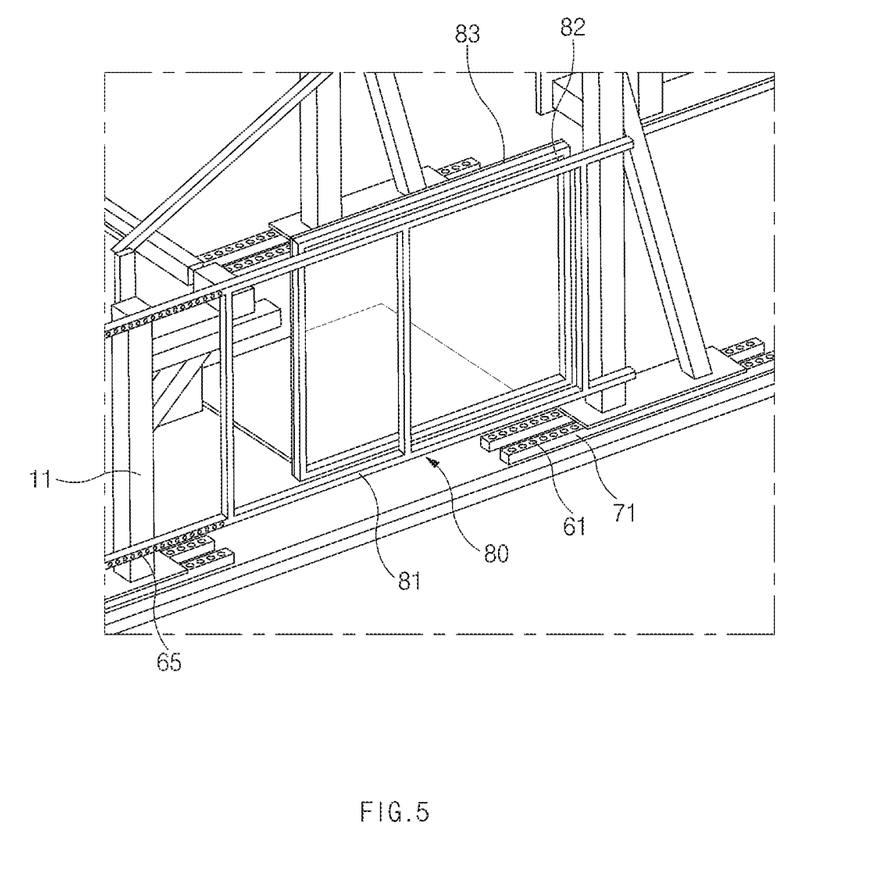
FIG. 5 is an enlarged perspective view illustrating a door of a universal buck for a sled test according to an exemplary embodiment of the present disclosure.

A door 80 copying or approximating or replicating a door of a real car may be mounted to be adjustable in position between the plurality of pillars 11, 12, and 13. As illustrated in FIGS. 1, 2 and 5, the door 80 may be installed between the first pillars 11 and the second pillars 12.

The door 80 may include an adjustment member 81 mounted to be adjustable in position between the plurality of pillars 11 and 12, an inner frame 82 attached to the adjustment member 81, and a panel 83 coupled to the inner frame 82.

The adjustment member 81 may have a plurality of fifth mounting holes 65 spaced apart from one another at a predetermined interval, and may be mounted to be adjusted, or adjustable, in position in a forward/backward direction with respect to the plurality of pillars 11, 12, and 13 through the plurality of fifth mounting holes 65.

Figure 6:
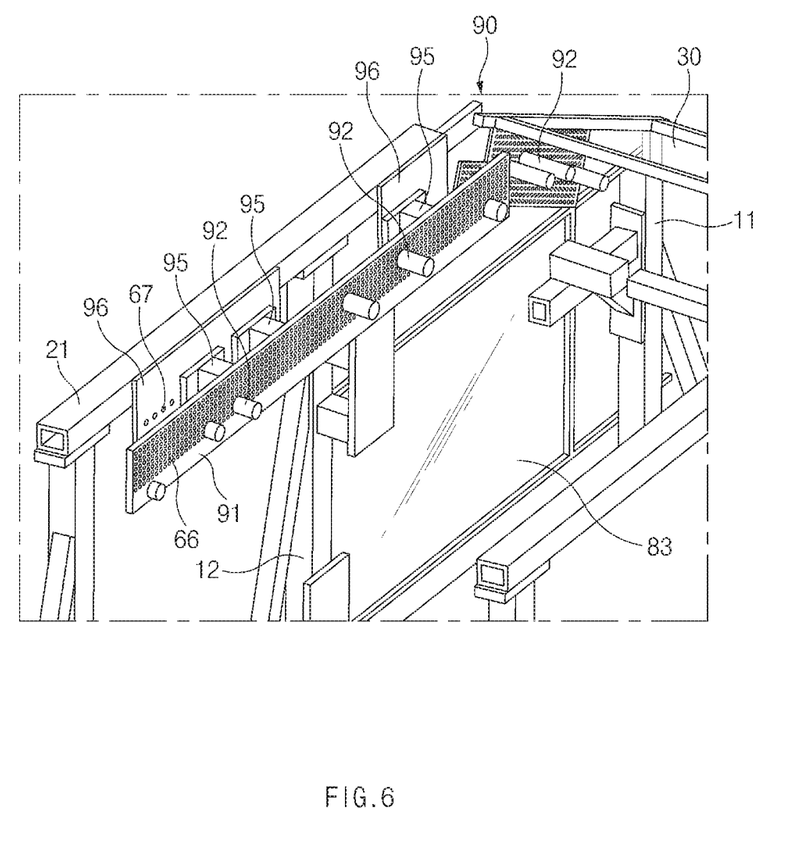
FIG. 6 is a perspective view illustrating a cable mounting part of a universal buck for a sled test according to an exemplary embodiment of the present disclosure.

As illustrated in FIG. 6, a cable mounting part 90 copying or approximating or replicating a cable mounting structure of a real car may be installed on the extending member 21 such that the cable mounting part 90 is adjustable in position, and a cable 98 may be mounted on the cable mounting part 90 to effectively realize, affect, replicate or record deformation of the first pillars 11 corresponding to A-pillars when a sled test is performed.

The cable mounting part 90 may include a mounting plate 91 including a plurality of sixth mounting holes 66 provided therein and a plurality of mounting tubes 92 selectively coupled to the mounting holes 66 of the mounting plate 91.

Figure 7:
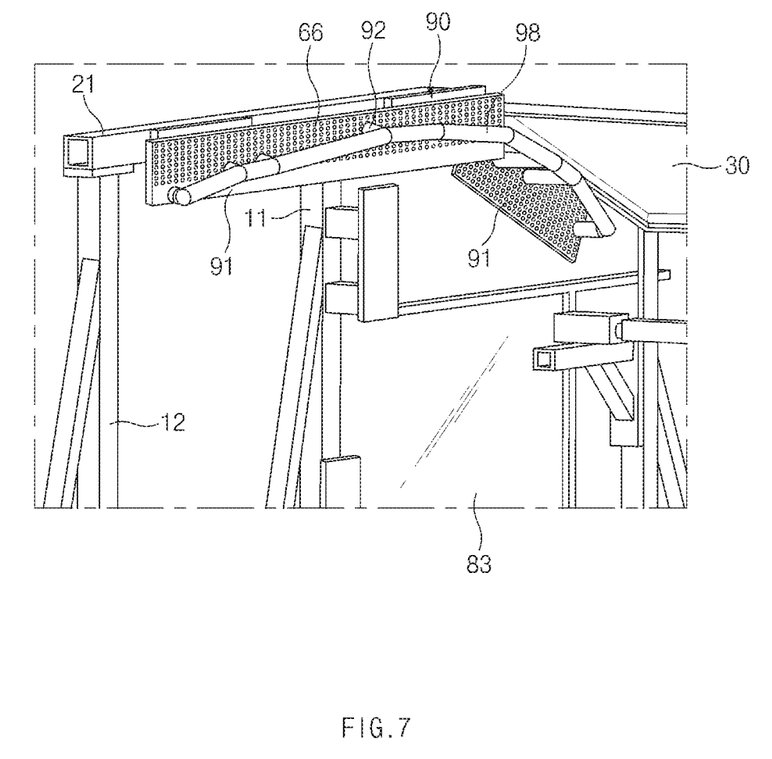
FIG. 7 is a perspective view illustrating a state in which a cable is installed in a cable mounting part of a universal buck for a sled test according to an exemplary embodiment of the present disclosure.

The mounting plate 91 may be mounted on the extending member 21 and/or the windshield 30. The plurality of sixth mounting holes 66 may be patterned in the mounting plate 91, and the plurality of mounting tubes 92 may be mounted to be adjustable in position on one surface of the mounting plate 91 through the plurality of sixth mounting holes 66. The cable 98 may be mounted on the plurality of mounting tubes 92.

In this manner, since the plurality of mounting tubes 92 may be coupled to the mounting plate 91 such that the plurality of mounting tubes 92 are adjusted in position on the mounting plate 91, the plurality of mounting tubes 92 may easily cope with a disposition structure of the cable 98.

Also, the plurality of mounting tubes 92 may have different lengths, thereby being more effectively aligning or interfacing with the disposition structure of the cable 98.

A plurality of coupling blocks 95 may be provided on an other surface of the mounting plate 91 and protrude toward the extending member 21, and here, the plurality of coupling blocks 95 may be coupled to the extending member 21 such that the plurality of coupling blocks 95 are adjustable in position.

A plurality of spacer blocks 96 in which a plurality of seventh mounting holes 67 are provided to be spaced apart from one another at a predetermined interval may be provided in the extending member 21 and/or the windshield 30. Here, the plurality of spacer blocks 96 may be coupled to the coupling blocks 95 such that the plurality of spacer blocks 96 are adjustable in position through the plurality of seventh mounting holes 67. The plurality of mounting holes 67 may be disposed to be lower than the extending member 21, and thus, an interference of the roof 20 and the cable 98 may be prevented.

In this manner, in an exemplary embodiment, since the yawing angle of the support plate 10 may be adjustable and the cable mounting part 90 may be disposed at a front portion of the universal buck, deformation of the first pillars 11 corresponding to A-pillars may be replicated or approximated when a small overlap test is performed, whereby replication or approximation of the small overlap test may be enhanced.

Figure 8:
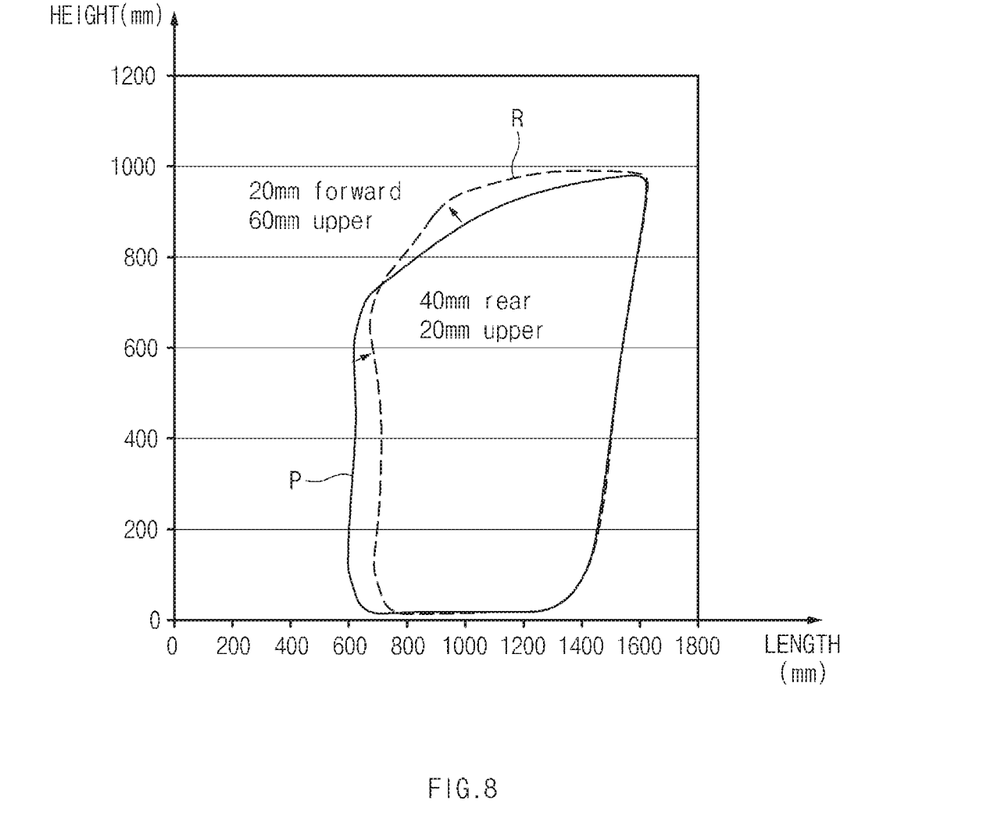
FIG. 8 is a graph illustrating deformation of first pillars before and after a small overlap test is performed using a universal buck according to an exemplary embodiment of the present disclosure.

FIG. 8 is a graph illustrating deformation of the first pillars before and after a small overlap test is performed using a universal buck according to an exemplary embodiment of the present disclosure.

In FIG. 8, the solid line P represents a shape of the first pillar 11 before the small overlap test was performed, and the dotted line R represents a shape of the first pillar 11 after the small overlap test was performed.

As can be seen from FIG. 8, since deformation of the first pillar when the small overlap test is performed is replicated or approximated, a dummy behavior, a development situation of a cable, and the like, may be effectively replicated or approximated or analyzed.

Also, seat mounting part 100 may be installed on the support plate 10, and a seat jig (not shown) for installing a seat may be installed on the seat mounting part 100.

According to an exemplary embodiment of the present disclosure, the seat jig may be configured as a seat jig for a whiplash test, and thus, the seat jig may smoothly move a seat in a forward/backward direction.

Also, a camera mounting part 110 in which a camera for imaging a dummy behavior when a sled test is performed is mounted may be installed.

The camera mounting part 110 may be rotatably installed in the second pillar 12 such that an image capture angle of the camera is adjustable. Since precise imaging and close-up imaging can be performed by the camera mounting part 110 and camera regarding the small overlap test, the small overlap test may be easily analyzed.

In addition, a treadle part 130 copying or approximating or replicating a brake pedal, an accelerator pedal, and the like, of a vehicle may be installed on the support plate 10 and may be adjustable in position, and a side airbag 120 copying or approximating or replicating a side airbag of a real car may be installed to be adjustable in position at the plurality of pillars 11, 12 and 13.

As described above, according to exemplary embodiments of the present disclosure, since various components such as the pillars 11, 12 and 13, the roof 20, the windshield 30, the door 80, and the cable 98 can be freely adjusted in position, a sled test may be effectively performed even in a state of advanced engineering of vehicles.

In particular, in an exemplary embodiment of the present disclosure, since the yawing angle can be adjusted, the small overlap test can be effectively replicated or approximated.

According to an exemplary embodiment of the present disclosure, since a plurality of components installed in a buck are easily adjusted in position to realize or approximate a general-purpose structure fitting to various car frame conditions, the buck may be positively utilized in a sled test for optimizing restraint devices and analyzing dummy behavior characteristics even in a stage of advanced engineering of vehicles.

In addition, a yawing angle may be freely adjusted through a rotatable structure of the support plate, and thus, replication or approximation of a small overlap test may be enhanced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A universal buck for a sled test, the universal buck comprising:
   a support plate rotatably installed to adjust a yawing angle of the support plate;
   a plurality of pillars laterally symmetrical to each other on the support plate;
   a roof mounted on at least some of the plurality of pillars;
   a windshield mounted between the plurality of pillars disposed on a front side among the plurality of pillars and a front end of the roof;
   a pair of extending members extending in a length direction of the support plate across upper ends of at least two pillars among the plurality of pillars, the pair of extending members disposed to be laterally symmetrical; and
   a cable mounting part disposed to be adjustable in position on each of the pair of extending members,
   wherein the cable mounting part includes a mounting plate having: a plurality of first mounting holes and a plurality of mounting tubes which are coupled to one surface of the mounting plate to be adjustable in position through the plurality of first mounting holes,
   wherein a cable is mounted on the plurality of mounting tubes, and
   wherein the plurality of pillars, the roof, and the windshield are mounted to be adjustable in position on the support plate.

2. The universal buck according to claim 1, wherein the support plate has a plurality of second mounting holes spaced apart from one another at a predetermined interval in both left and right positions of the support plate, and
   the plurality of pillars are mounted to be adjustable in position with respect to the support plate via the plurality of second mounting holes.

3. The universal buck according to claim 1, further comprising:
   a camera mounting part for imaging a dummy behavior when a sled test is performed,
   wherein the camera mounting part is rotatably installed to adjust an image capture angle of a camera.

4. The universal buck according to claim 1, further comprising a door mounted to be adjustable in position between the plurality of pillars.

5. The universal buck according to claim 4, wherein the door includes an adjustment member installed to be adjustable in position between the plurality of pillars, an inner frame attached to the adjustment member, and a panel coupled to the inner frame.

6. The universal buck according to claim 5, wherein the adjustment member has a plurality of fourth mounting holes spaced apart from one another at a predetermined interval, and is mounted to be adjustable in position between pillars of the plurality of pillars via the plurality of fourth mounting holes.

7. The universal buck according to claim 1, wherein each of the plurality of mounting tubes has a different length.

8. The universal buck according to claim 7, wherein the mounting plate has a plurality of coupling blocks on another surface of the mounting plate, and
   wherein the plurality of coupling blocks protrude toward the pair of extending members and are coupled to the pair of extending members such that the plurality of coupling blocks are adjustable in position.

9. The universal buck according to claim 8, wherein each of the pair of extending members has a spacer block having a plurality of fifth mounting holes,
   the plurality of fifth mounting holes are located to be lower than the pair of extending members, and
   the plurality of coupling blocks are coupled to the spacer block such that the plurality of coupling blocks are adjustable in position through the plurality of fifth mounting holes.

10. The universal buck according to claim 1, wherein the plurality of pillars include:
    a pair of first pillars installed on a front side of the support plate and disposed to be symmetrical laterally;
    a pair of second pillars spaced apart from the pair of first pillars backwardly and disposed to be symmetrical laterally; and a pair of third pillars spaced apart from the pair of second pillars backwardly and disposed to be symmetrical laterally.

11. The universal buck according to claim 10, wherein the pair of extending members extend in the length direction of the support plate across upper ends of the pair of second pillars and upper ends of the pair of third pillars.

12. The universal buck according to claim 11, wherein the roof is mounted on the pair of extending members,
wherein each of the extending members has a plurality of third mounting holes spaced apart from one another at a predetermined interval in the pair of extending members, and
the roof is mounted to be adjustable in position via the plurality of third mounting holes of the pair of extending members.

13. The universal buck according to claim 11 wherein the windshield is mounted to be adjusted at a tilt angle between upper ends of the pair of first pillars and front end portions of the pair of extending members.

14. A universal buck for a sled test, the universal buck comprising:
a support plate installed to be rotatable centered around a vertical axial line;
a base plate for supporting rotation of the support plate;
a plurality of pillars laterally symmetrical to each other on the base plate;
a roof installed on at least some of the plurality of pillars;
a windshield installed between pillars disposed on a front side among the plurality of pillars and a front end of the roof;
a pair of extending members extending in a length direction of the support plate across upper ends of at least two pillars among the plurality of pillars, the pair of extending members disposed to be laterally symmetrical; and
a cable mounting part mounted to be adjustable in position on the pair of extending members,
wherein the cable mounting part includes a mounting plate having a plurality of mounting holes and a plurality of mounting tubes which are coupled to one surface of the mounting plate to be adjustable in position through the plurality of mounting holes,
wherein a cable is mounted on the plurality of mounting tubes, and
wherein the plurality of pillars, the roof, and the windshield are mounted to be adjustable in position on the support plate.

15. The universal buck according to claim 14, wherein the support plate is connected to the base plate through a pivot and is rotatable around the pivot with respect to the base plate.

16. The universal buck according to claim 15, wherein the pivot includes a circular bearing, and the circular bearing has a rotational center.

17. The universal buck according to claim 16, wherein a slot having a circular arc shape is provided in at least one of a front end portion and a rear end portion of the support plate, and the base plate has a plurality of fastening holes spaced apart from one another in a circular arc direction of the slot.

* * * * *